March 15, 1955     D. L. OLSON     2,703,962
ROCKET ENGINE INJECTOR HEAD
Filed Sept. 30, 1952
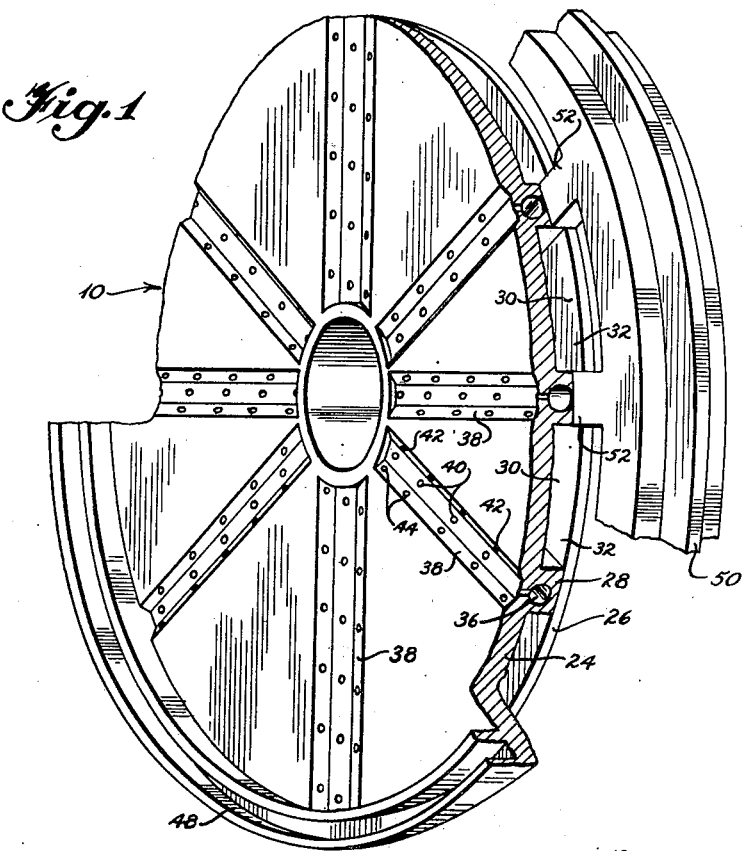
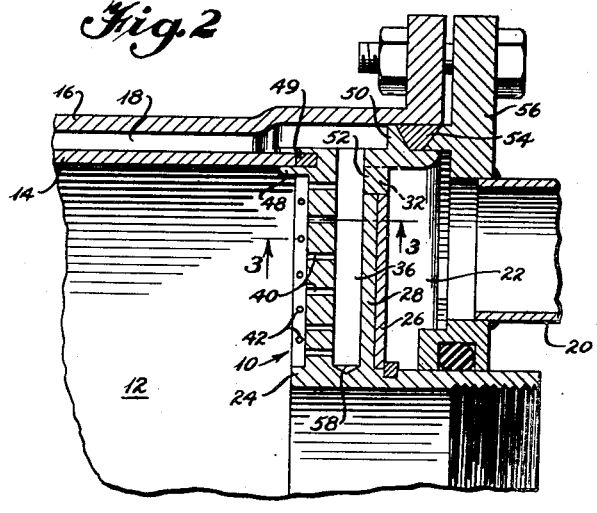
Inventor
Delwyn L. Olson 2,703,962
Patented Mar. 15, 1955

2,703,962
ROCKET ENGINE INJECTOR HEAD

Delwyn L. Olson, Rockaway, N. J., assignor, by mesne assignments, to the United States of America as represented by the Secretary of the Navy Application September 30, 1952, Serial No. 312,211

5 Claims. (Cl. 60—39.74)

This invention relates to fuel feeding devices for engines of the type primarily useful for powering aircraft of the piloted or pilotless classes.

In such engines, particularly liquid bi-propellant rocket engines, it is desirable to feed propellants to the combustion chamber at a constant velocity and quantity regardless of the point of entry on the injector face. In the usual systems of supplying propellants for combustion this is not accomplished. Accordingly, it is an object of this invention to provide an improved injector head having a number of radially arranged wedge shaped propellant chambers that converge toward a common center and a plurality of orifices opening into the chambers, the propellant chambers being so proportioned relative to the cross sectional area of the orifices that the depletion in quantity of the flowing propellants is directly proportional to the decrease in propellant chamber area, with the result that the velocity of the propellants across the injector face within each wedge shaped chamber will be substantially constant and the static pressure at each of the orifices will be substantially constant, as explained in the sentences which follow. Since the orifices are all of the same cross-sectional area and form, the velocities and quantities of liquid flowing through each of the orifices will be equal. Furthermore, it is an accepted principle of fluid dynamics that, with an incompressible liquid, the quantity of liquid flowing through a conduit is equal to the cross-sectional area of the conduit multipled by the velocity of the flowing liquid. It is evident, therefore, that if the cross-sectional area of the conduit is reduced in direct proportion to the depletion of the quantity bled off through the orifices, the velocity will remain substantially the same at any point along the conduit, the friction involved being considered only sufficient to keep the static pressure constant at each outlet. Therefore, as stated above, with the velocity across the various orifices and the static pressure constant, the quantity and velocity of the liquid flowing from each of the orifices will also be constant. A rounded end or dam at the inner end of each chamber serves to convert the velocity head at that point into static pressure to offset the friction losses and to keep the last row of orifices well separated so that the streamlines can form naturally.

Other objects and important features will become apparent in following the description of the illustrated form of the invention.

In the drawing:

Fig. 1 is a fragmentary perspective view of the injector head;

Fig. 2 is a fragmentary sectional view of the head, showing it in place within a rocket engine;

Fig. 3 is an enlarged sectional view taken on the plane of line 3—3 of Fig. 2 and in the direction of the arrows.

To illustrate an environment of the fuel injector head 10, a part of a rocket engine thrust or combustion chamber 12 is shown, the chamber being defined by an inner wall 14 around which there is an outer wall 16, the cooling jacket 18 being between these walls. The minor propellant is fed through the cooling jacket and into the head 10.

Supply pipe 20 for the main propellant is connected in the usual way with the engine structure and is arranged to deliver into the annular header 22 of the engine. The injector head 10 is constructed to fit into the combustion chamber 12 for communication with both the header 22 and the jacket 18, whereby both propellants are accepted by the injector head 10.

Injector head 10 consists of a preferably circular face plate 24 held spaced from a baffle plate 26 by means of ribs 28 that extend radially of the plates 24 and 26. The ribs cooperate with the baffle plate and face plate to form a plurality of radially arranged, substantially wedge shaped chambers 30, each having a propellant inlet 32 at its outer, larger end. Since the baffle plate 26 forms one wall of the header 22 (Fig. 2) and is shorter than the opposite wall of the header each inlet 32 is in direct communication with the interior of the header, so that flow is established from supply pipe 22 to the interior of each wedge shaped chamber 30.

Axially disposed passages 36, which also may be tapered or wedge shaped, are provided in the webs 28, opening at their outer ends in communication with the cooling jacket 18 in order to admit the minor propellant into the head 10. Grooves 38 paralleling the ribs 28 are formed in the front of face plate 24, and orifices 40 are serially arranged in these grooves. In each groove there is the radial row of orifices 40 which communicate with the passage 36 in one of the ribs, a row of orifices 42 which communicates with one chamber 30, and another row of orifices 44 which open into the next adjacent chamber 30. In this way an impinging jet injector is formed with the minor propellant discharging axially of the combustion chamber, and the main fuel intersecting the minor propellant a short distance from the face plate 24. As practiced in the art, one propellant will be a fuel and the other an oxidizer.

A forwardly opening annular channel 48 at the periphery of the face plate 24 receives a gasket 49 on top of which there is the inner end of wall 14. This seals the face plate of the injector head to the engine combustion chamber. A circular flange 50 held spaced from the periphery of the baffle plate 26 by means of spacers 52, is adapted to abut a gasket 54 that seats on the mounting flange 56 of the engine, thereby providing another propellant seal. Other seals as shown, or as will be required are used to provide tight joints throughout the engine fuel system.

In operation the minor propellant passes from the cooling jacket 18 directly into passages 36, whence it flows through orifices 40 for burning. The main propellant, being the major propellant in quantity required, passes from supply pipe 20 into the header 22, over the baffle plate 26 thereby entering chambers 30 by way of the chamber inlets 32. Propellant entering the chambers 30 then passes through the orifices 42 and 44 arranged with orifices 40 to produce the desired spray pattern. Since chambers 30 reduce in cross sectional area as the central axis of the injector head 10 is approached, and since the cross sectional area of each orifice 42 and 44 is alike, the velocity of injected propellant through the chambers 30 will be constant at any point across the injector face. This is so because the chambers 30 are so proportioned relative to the cross sectional areas of the orifices that the depletion in quantity of flowing liquid is directly proportional to the area, with the result being that the velocity of the liquid across the injector face within the chambers 30 will be substantially constant. The pressure drop through the chambers 30 due to friction is offset by a dam formed by a preferably rounded wall 58 at the inner end of each chamber 30 to convert the velocity head at that point to static pressure.

It is apparent that various modifications of the specifically described form of the invention may be made without departing from the scope of the following claims.

What is claimed is:

1. In a propellant injector, a generally circular face plate having radially disposed webs fixed thereto, a baffle fixed to said webs and being substantially parallel to said face plate, parts of said plate, webs and baffle forming generally wedge shaped propellant chambers at the larger end of each of which there being a propellant inlet, each web having a propellant passage extending axially thereof and radially of the face plate, a plurality of discharge orifices in said webs having longitudinal axes normal to said face plate and arranged in a row along the longitudinal axis of each web, said face plate having rows of orifices arranged at an angle to the orifices in said webs and communicating with said chambers so that propellant being ejected through the orifices in said face plate will impinge upon the propellant being ejected from the orifices in said webs, all of the orifices in said face plate having similar velocity coefficients and yet the velocity head at all of the orifices in said plate being equal due to the decrease in cross-sectional area of said chambers in direct proportion to the depletion in quantity of the propellant in the chambers as portions of the propellant pass through the various orifices in turn.

2. The injector of claim 1 and means located at the periphery of said face plate for at least partially supporting the injector.

3. A constant velocity injector for an engine, said injector comprising the combination of a first and second plate, said plates being spaced and juxtaposed, radially arranged and equally spaced webs holding said plates spaced from each other and defining two angularly inclined walls with chambers between said plates, said chambers adapted to receive an engine propellant, each web having a longitudinal bore, orifices opening laterally through the bore of each web, said bores adapted to receive a second engine propellant, said first plate having a plurality of orifices near each web so that the propellants from said chambers and said bores may mix during emission, and said chambers reducing in cross sectional area toward the inner ends thereof in direct proportion to the depletion in the propellant quantity in said chambers brought about by passage of propellant through the various orifices in turn, whereby the propellant issuing through all of said orifices in the chambers is discharged at constant velocity.

4. In an injector for an engine, a head having a plurality of chambers, each chamber having an inlet at one end and a plurality of discharge orifices from said inlet to the opposite end of the chamber, walls defining said chamber which diverge toward said inlet to thereby produce varying cross sectional areas of said chamber which increase progressively from the inner end of said chamber to said inlet thereof in direct proportion to the depletion in quantity of propellant flowing through said chamber as propellant is cumulatively discharged through the various orifices in turn, whereby the propellant issuing through each of the said orifices is discharged at substantially constant velocity and in substantially constant quantity as that discharged through any other of said orifices.

5. In a propellant injector, a head having a propellant chamber provided with an inlet at one end, said chamber having walls that converge toward the opposite end thereof at which there is a dam to convert the velocity head of flowing propellant at that point to static pressure in order to at least partially overcome friction losses in the passing of propellant through said chamber, at least one of said walls having a number of spaced orifices therein, the depletion in quantity of flowing propellant through the chamber by passing through the orifices being directly proportional to the reduction in cross sectional area of the chamber.

References Cited in the file of this patent

UNITED STATES PATENTS 2,409,036     Goddard _____ Oct. 8, 1946